US009794374B2

(12) United States Patent
Singh et al.

(10) Patent No.: US 9,794,374 B2
(45) Date of Patent: Oct. 17, 2017

(54) SYSTEM AND METHOD FOR IDENTIFYING AND DISPLAYING APPLICATION CARD OBJECTS BASED ON CONTEXTUAL DATA CORRESPONDING TO APPLICATION FUNCTION IDENTIFIERS

(71) Applicant: Quixey, Inc., Mountain View, CA (US)

(72) Inventors: Brahm Singh, Santa Clara, CA (US); Kalyan Desineni, Mountain View, CA (US); Rajesh Konda, San Jose, CA (US); Yeongmi Jeon, Sunnyvale, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

(21) Appl. No.: 15/246,456

(22) Filed: Aug. 24, 2016

(65) Prior Publication Data

US 2017/0041437 A1 Feb. 9, 2017

Related U.S. Application Data

(63) Continuation of application No. 14/820,140, filed on Aug. 6, 2015.

(51) Int. Cl.
*G06F 15/16* (2006.01)
*H04L 29/06* (2006.01)
(Continued)

(52) U.S. Cl.
CPC ............ *H04L 67/42* (2013.01); *G06F 3/0482* (2013.01); *G06F 9/00* (2013.01); *G06Q 50/01* (2013.01);
(Continued)

(58) Field of Classification Search
CPC ....... G06F 2203/04803; G06F 3/04886; G06F 3/0481; G09G 2340/145; H04W 4/00;
(Continued)

(56) References Cited

U.S. PATENT DOCUMENTS 7,313,687 B2 * 12/2007 Kaler .................... H04L 29/06
713/152
8,984,071 B1 3/2015 Oliver et al.
(Continued)

OTHER PUBLICATIONS

International Search Report and Written Opinion for PCT Application No. PCT/IB2016/054759, dated Nov. 24, 2016, 9 pages.

*Primary Examiner* — Mohamed Wasel
(74) *Attorney, Agent, or Firm* — Harness, Dickey & Pierce, P.L.C.

(57) ABSTRACT

A server includes a network communication device, a storage device, and a processing device. The processing device executes computer-readable instructions that, when executed by the processing device, cause the processing device to: receive contextual data from a client computing device via the network communication device, the contextual data indicates a first application view displayed on the client computing device; identify a first application function ID that identifies a first application function corresponding with the first application view; determine a first user intent ID that corresponds with the first application function ID; determine a second user intent ID that transitions from the first user intent ID; identify a second application function ID that corresponds with the second user intent ID; retrieve a card object corresponding with the second application function ID from the storage device; and transmit the card object to the client computing device via the network communication device.

21 Claims, 10 Drawing Sheets

(51) Int. Cl.
  *H04L 29/08*    (2006.01)
  *G06F 3/0482*   (2013.01)
  *G06Q 50/00*    (2012.01)
  *G06F 9/00*     (2006.01)
  *H04L 12/26*    (2006.01)
  *G06Q 30/02*    (2012.01)

(52) U.S. Cl.
  CPC .............. *H04L 67/02* (2013.01); *H04L 67/10* (2013.01); *G06Q 30/02* (2013.01); *H04L 43/045* (2013.01)

(58) Field of Classification Search
  CPC ....... H04L 43/045; H04L 67/02; H04L 67/10; H04L 67/42
  See application file for complete search history.

(56) References Cited

U.S. PATENT DOCUMENTS

| | | | |
|---|---|---|---|
| 9,146,651 B1* | 9/2015 | Wick | G06F 3/048 |
| 9,262,057 B2* | 2/2016 | Brown | G06F 9/445 |
| 9,304,612 B2* | 4/2016 | Roper | G06F 3/03545 |
| 2011/0167340 A1 | 7/2011 | Moore et al. | |
| 2012/0042036 A1 | 2/2012 | Lau et al. | |
| 2012/0086717 A1* | 4/2012 | Liu | G06F 9/4445 345/564 |
| 2012/0089992 A1* | 4/2012 | Reeves | G06F 3/1431 719/318 |
| 2012/0233567 A1* | 9/2012 | Brown | G06F 9/445 715/810 |
| 2013/0178241 A1 | 7/2013 | Duggirala et al. | |
| 2015/0074589 A1* | 3/2015 | Pan | G06F 3/04886 715/781 |
| 2015/0109230 A1 | 4/2015 | Long | |
| 2015/0352444 A1* | 12/2015 | Smith | A63F 13/69 463/31 |
| 2016/0077682 A1* | 3/2016 | Reeves | G06F 9/4443 715/733 |
| 2016/0092064 A1* | 3/2016 | Wu | G06F 3/0482 715/789 |
| 2016/0232355 A1* | 8/2016 | Li | G06F 21/6245 |
| 2017/0039291 A1 | 2/2017 | Singh et al. | |

* cited by examiner

SYSTEM AND METHOD FOR IDENTIFYING AND DISPLAYING APPLICATION CARD OBJECTS BASED ON CONTEXTUAL DATA CORRESPONDING TO APPLICATION FUNCTION IDENTIFIERS

CROSS-REFERENCE TO RELATED APPLICATIONS

The present application is a continuation of U.S. patent application Ser. No. 14/820,140 filed on Aug. 6, 2015. The entire disclosure of the application referenced above is incorporated by reference.

FIELD

This disclosure relates to determining application cards for display on a mobile computing device based on contextual data of the mobile computing device.

BACKGROUND

Many mobile computing devices can install and execute applications. Applications include application functions that a user of the mobile computing device may use to perform a particular task. For example, a crowd-sourced review application may include a restaurant review function that enables a user to view restaurant reviews. A ride-requesting application may include a ride-requesting function that enables a user to request a ride from one place to another. Many mobile computing devices allow users to switch between applications. For example, a user can switch from viewing a restaurant review in the crowd-sourced review application to requesting a ride to the restaurant in the ride-requesting application.

SUMMARY

A server may include a network communication device, a storage device and a processing device. The storage device may store an application function data store, a user intent data store and a card data store. The application function data store stores application function identifiers (IDs) that identify application functions, and user intent IDs that identify user intents corresponding with the application function IDs. The user intent data store stores the user intent IDs and transitions between the user intent IDs. The card data store stores card objects corresponding with the application function IDs. Each card object may include computer-readable instructions that are executable at client computing devices to perform the application function identified by the application function ID. The processing device can execute computer-readable instructions that, when executed by the processing device, cause the processing device to receive contextual data from a client computing device via the network communication device. The contextual data may indicate a first application view currently being displayed on the client computing device.

The processing device may identify a first application function ID that identifies a first application function corresponding with the first application view by comparing the contextual data with the application function IDs stored in the application function data store. The processing device may determine a first user intent ID that corresponds with the first application function ID. The first user intent ID may indicate a current user intent of a user of the client computing device. The processing device may determine a second user intent ID that transitions from the first user intent ID. The second user intent ID may indicate a prediction of a subsequent user intent of the user based on the current user intent. The processing device may identify a second application function ID that corresponds with the second user intent ID. The second application function ID may identify a second application function. The processing device may retrieve a card object corresponding with the second application ID from the card data store. The processing device may transmit the card object to the client computing device via the network communication device.

A mobile computing device may include a touchscreen display, a plurality of sensors, a transceiver, a memory, and a computing processor. The computing processor may execute computer-readable instructions that, when executed by the computing processor, cause the computing processor to display a first application view representing a first application function on the touchscreen display. The computing processor may store contextual data in the memory. The contextual data may include a first application function identifier (ID) that identifies the first application function. The contextual data may include sensor measurements measured by the plurality of sensors. The contextual data may include application function usage data including a history of application views displayed on the touchscreen display. The computing processor may transmit the contextual data to a server via the transceiver. The computing processor may receive a card object from the server in response to transmitting the contextual data to the server. The card object may indicate a second application function ID that identifies a second application function. The computing processor may determine a rendering of an application card representing the second application function based on the card object. The computing processor may display the application card concurrently with the first application view.

A computer-implemented method may include storing, in a storage device of a server, an application function graph that stores application function identifiers (IDs) as graph nodes and user intent IDs that identify user intents corresponding with the application function IDs. The application function IDs identify application functions. The method may include storing, in the storage device, a user intent graph that stores the user intent IDs as graph nodes and transitions between the user intent IDs as edges. The method may include storing, in the storage device, a card data store that stores card objects corresponding with the application function IDs. Each card object may include computer-readable instructions that are executable at client computing devices to perform the application function identified by the application function ID. The method may include receiving, via a network communication device of the server, contextual data from a client computing device. The contextual data may indicate a first application view currently being displayed on the client computing device.

The method may include identifying, by a processing device of the server, a first application function ID that identifies a first application function corresponding with the first application view by comparing the contextual data with the application function IDs stored in the application function data store. The method may include determining, by the processing device, a first user intent ID that corresponds with the first application function ID. The first user intent ID may indicate a current user intent of a user of the client computing device. The method may include determining, by the processing device, a second user intent ID that transitions from the first user intent ID. The second user intent ID may indicate a prediction of a subsequent user intent of the user based on the current user intent. The method may include identifying, by the processing device, a second application function ID that corresponds with the second user intent ID. The second application function ID identifies a second application function. The method may include retrieving, by the processing device, a card object corresponding with the second application ID from the card data store. The method may include transmitting, via the network communication device, the card object to the client computing device.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

FIG. 2A-3B are schematic diagrams illustrating example application cards that can be displayed on the client computing device.

Like reference symbols in the various drawings indicate like elements.

DETAILED DESCRIPTION

Figure 1:
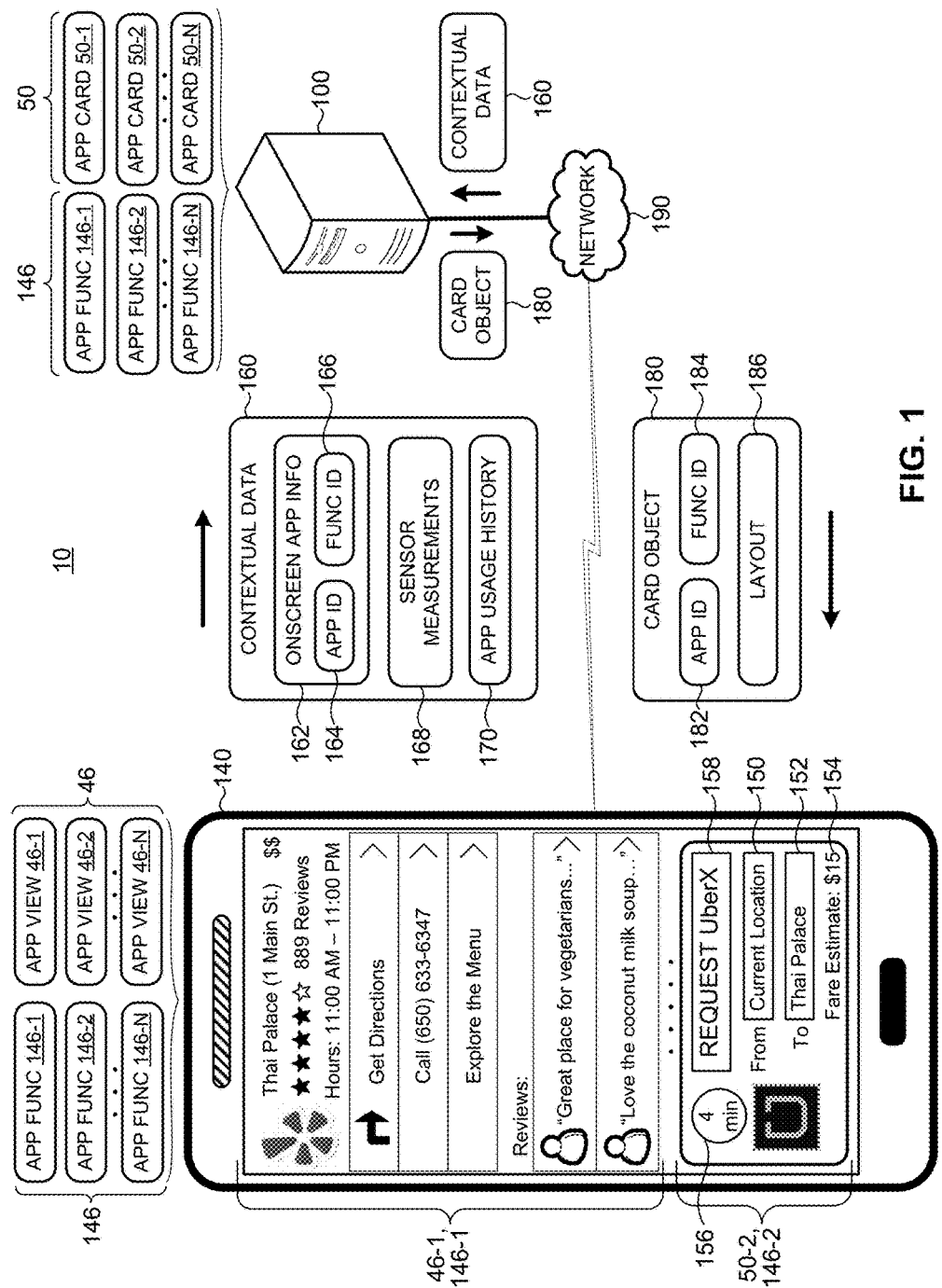
FIG. 1 is a schematic diagram that illustrates an example system for displaying an application card on a client computing device based on contextual data.

Mobile computing devices enable users to switch between applications in order to perform different application functions. Switching between applications is time-consuming because it takes considerable time to launch an application and manually navigate to an application view within the application. Furthermore, a user may have to press several buttons to switch from viewing a first application view in a first application to viewing a second application view in a second application. For example, the user may have to press a home button to switch to a home screen, select an icon to launch the second application, and then navigate to the second application view within the second application. Excessive presses of the home button may accelerate wear and tear. Time wasted in manually navigating between application views may increase power consumption and accelerate battery drainage. Lastly, due to the exponential growth of applications, discovering application functions and their corresponding application views has become increasingly challenging.

The mobile computing device can display a first application view of a first application function and concurrently display an application card for a second application function. The application card may include application controls that allow a user of the mobile computing device to use the second application function without manually navigating to a second application view of the second application function. The application card may include executable instructions that the mobile computing device can execute to perform the second application function. The mobile computing device can display the application card based on contextual data of the mobile computing device.

The contextual data may indicate an application view currently being displayed on the mobile computing device. For example, upon displaying an application view for a restaurant-review function in a crowd-sourced review application, the mobile computing device can display an application card for a request-a-ride function in a ride-requesting application. The contextual data can include sensor measurements (e.g., accelerometer readings). For example, upon detecting that the user of the mobile computing device is walking and using the restaurant-review function, the mobile computing device can display an application card for a reserve-table function from a table-reserving application. The contextual data may include a history of previously displayed application views and the mobile computing device may display the application card based on the history.

The application card may display graphical user interface (GUI) elements that receive function parameters for the application function represented by the application card. The function parameters may be populated based on the contextual data. For example, a destination address in the application card for the request-a-ride function may be populated with a restaurant address displayed in the application view for the restaurant-review function. The GUI elements in the application card may be similar to GUI elements in an application view of the application function. Furthermore, similar to the GUI elements in the application view of the application function, the GUI elements in the application card can invoke the same application programming interfaces (APIs), libraries and endpoints to operate in the same manner.

FIG. 1 illustrates an example system 10 that displays an application view 46 and an application card 50 in conjunction with an application function 146. In the illustrated example, the system 10 includes a server 100, a client computing device 140, and a network 190. The server 100 and the client computing device 140 may store applications that have application functions 146 (e.g., 146-1, 146-2 . . . 146-N). The applications may have application views 46 (e.g., 46-1, 46-2 . . . 46-N) that represent the application functions 146. The server 100 may store application cards 50 (e.g., 50-1, 50-2 . . . 50-N) that represent the application functions 146. The application views 46 and the application cards 50 may include computer-readable instructions that can be executed by the client computing device 140 to perform representative application functions 146. The application views 46 and the application cards 50 may invoke application programming interfaces (APIs), libraries and/or endpoints associated with their representative applications functions 146 to perform the application functions 146.

The client computing device 140 may display an application view 46-1 of an application function 146-1. The application view 46-1 may be referred to as a current application view, for example, because a user of the client computing device 140 may be viewing the application view 46-1. In the example of FIG. 1, the application view 46-1 displays a representation of a restaurant review function of a crowd-sourced review application. An example of the crowd-sourced review application is the YELP® application (hereinafter, Yelp). As illustrated, the application view 46-1 is displaying a restaurant review for a restaurant named Thai Palace.

The client computing device 140 may display an application card 50-2 of another application function 146-2. The application function 146-2 may be referred to as a subsequent application function, for example, because the user of the client computing device 140 may use the application function 146-2 after (e.g., immediately after) using the application function 146-1. In the example of FIG. 1, the application function 146-2 is a request-a-ride function of a ride-requesting application. An example of the request-a-ride function is the Request an UberX® driver function (hereinafter, Request UberX) in the UBER® application (hereinafter, Uber). The application card 50-2 may include computer-readable instructions that upon execution perform the application function 146-2.

The application card 50-2 may be referred to as a Deep View Card (DVC), for example, because the application card 50-2 displays GUI elements that correspond with function parameters of the application function 146-2. Put another way, an application card 50-2 allows a user to leverage a function of the corresponding application, and in some scenarios, to parameterize the card with one or more values. For example, a user may enter a pickup location and/or a drop-off location into an application card that leverages the reserve UberX function of Uber. The client computing device 140 may display the application card 50-2 such that the application card 50-2 hovers over the application view 46-1. The client computing device 140 may control a transparency of the application card 50-2 such that the application card 50-2 may not conceal portions of the application view 46-1. The GUI elements of the application card 50-2 enable a user to use the application function 146-2 without switching applications and manually navigating to an application view 46-2 representing the application function 146-2.

In the illustrated example, the GUI elements of the application card 50-2 include first and second text fields 150, 152, first and second text labels 154, 156, and a button 158. The text fields 150, 152 may receive parameters for the application function 146-2. For example, the first text field 150 may receive a current address and the second text field 152 may receive a destination address. The first and second text fields 150, 152 may be populated based on information displayed in the application view 46-1. For example, a restaurant address displayed by the restaurant review function may be used to populate the destination address. The first and second text labels 154, 156 may display information that is determined by invoking an API, a library and/or an endpoint associated with the application function 146-2. For example, the application card 50-2 may use a fare estimate endpoint associated with the application function 146-2 to determine a fare estimate displayed by the text label 154. Similarly, the application card 50-2 may use a time estimate endpoint associated with the application function 146-2 to determine a time estimate displayed by the text label 156.

The client computing device 140 may receive a selection of the button 158, for example, when the user presses the button 158. The application card 50-2 may use the parameters received through the text fields 150 and 152 to perform a task (e.g., request an UberX ride) upon receiving a selection of the button 158. By determining (e.g., predicting) that the user of the client computing device 140 may use the application function 146-2 and automatically displaying the application card 50-2, the user may not have to switch applications and manually navigate to the application view 46-2. For example, the user may not have to press a home button to go to a home screen, find an Uber icon in an application tray, select the Uber icon to launch Uber, and then navigate to the request UberX function within the Uber application.

The client computing device 140 may receive the application card 50-2 from the server 100. Receiving the application card 50-2 indicates that the server 100 has determined (e.g., predicted) the application function 146-2 as the subsequent application function the user of the client computing device 140 may use after using the application function 146-1. The client computing device 140 may send contextual data 160 to the server 100. The server 100 may use the contextual data 160 to select the application card 50-2 from the application cards 50. The server 100 may transmit the application card 50-2 to the client computing device 140 as a card object 180 (e.g., using JavaScript Object Notation (JSON)).

The contextual data 160 may include on-screen application information 162. The on-screen application information 162 may include an application identifier (application ID) 164 that indicates a current application being displayed at the client computing device 140. For example, the application ID 164 may include an application ID for the YELP® application. The on-screen application information 162 may include an application function ID 166 that indicates a current application function being displayed at the client computing device 140. For example, the application function ID 166 may include an application function ID for the application function 146-1. The on-screen application information 162 may include information that indicates the application view 46-1. The on-screen application information 162 may include information displayed at the client computing device 140. For example, the on-screen application information 162 may indicate that the client computing device 140 is displaying a restaurant review for a restaurant named Thai Palace.

The contextual data 160 may include sensor measurements 168. The client computing device 140 may include sensors (e.g., location sensor, accelerometer, gyroscope, or the like). The sensors may record (e.g., capture) the sensor measurements 168. Example sensor measurements 168 may include a location of the client computing device 140, an accelerometer reading, a gyroscope reading or the like. The contextual data 160 may include an application function usage history 170. The application function usage history 170 may indicate a sequence in which the application functions 146 were used. For example, the application function usage history 170 may indicate that the application function 146-2 of the second application is used immediately after the application function 146-1 of the first application 85% of the time. The application function 146-2 being used immediately after the application function 146-1 may refer to the application function 146-2 being used within a threshold amount of time from the usage of the application function 146-1 (e.g., within 5 seconds).

The server 100 receives the contextual data 160 and determines a relevant application card 50 based on the contextual data 160. In the example of FIG. 1, the server 100 determines the application card 50-2 as the most relevant application card 50. Determining the relevant application card 50 may include determining the subsequent application function that the user of the client computing device 140 may use after using the current application function. In the example of FIG. 1, the server 100 determines the application function 146-2 as the subsequent application function based on the application function 146-1 being the current application function. The server 100 indicates its determination of the subsequent application function via the card object 180.

The card object 180 may include an application ID 182. The application ID 182 may identify an application (e.g., Uber) that includes the application function 146-2. The card object 180 may include an application function ID 184. The application function ID 184 may identify the application function 146-2. The card object 180 may indicate a layout 186 for the application card 50-2. The layout 186 may include computer-readable instructions that the client computing device 140 can execute to render the application card 50-2. The layout 186 may indicate the GUI elements for the application card 50-2. The layout 186 may indicate function parameters for the application function 146-2. The server 100 may transmit the layout 186 as a layout file. The client computing device 140 receives the card object 180 and renders the application card 50-2 based on the information included in the card object 180.

Figure 2:
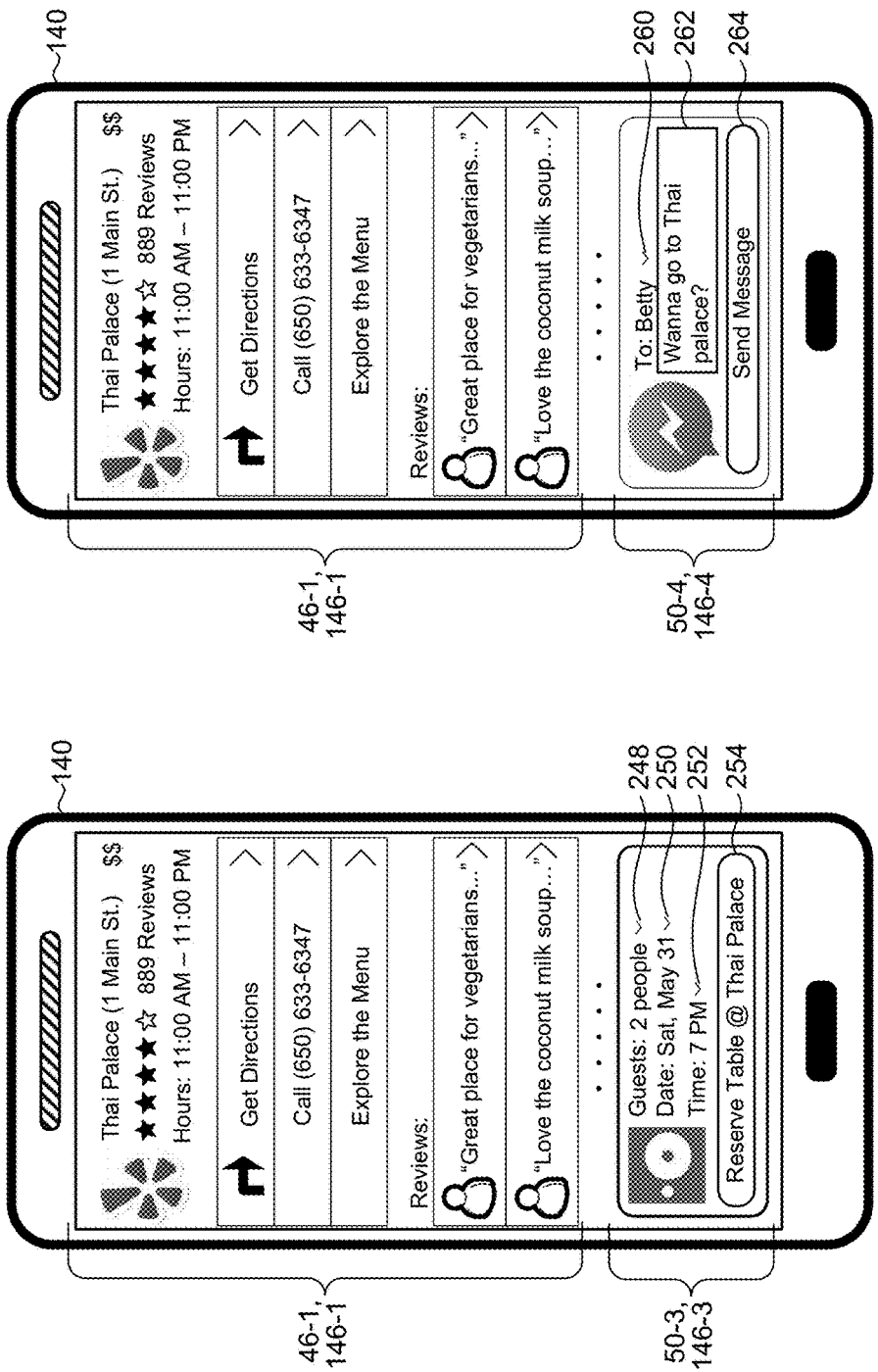

FIG. 2A illustrates another example application card 50-3 for an application function 146-3. In the example of FIG. 2A, the application function 146-3 refers to a "reserve table" function, where a user can request a reservation at a particular establishment at a particular date and time. The application view 46-1 may display a restaurant review of a restaurant and the application card 50-3 enables the user to reserve a table at the restaurant. For example, the application view 46-1 may display a review of Thai Palace and the application card 50-3 enables the user to reserve a table at Thai Palace. By displaying the application card 50-3 in conjunction with the application view 46-1, the user does not have to manually navigate to the application view 46-3 representing the application function 146-3. For example, a user viewing a review of Thai Palace on the YELP® application does not have to press the home button to go to the home screen, launch another application (e.g., the OPENTABLE® application), and then navigate to the reserve table function within the OPENTABLE® application.

The application card 50-3 may include GUI elements that enable the user of the client computing device 140 to use (e.g., operate) the application function 146-3. The GUI elements may include drop-downs 248, 250, 252, and a button 254. The drop-down 248 may allow a user to enter a number of guests that may go to the restaurant. The drop-down 250 may allow a user to enter a date for the table reservation. The drop-down 252 may allow a user to enter a reservation time. The button 254 may be a submit button. Upon receiving a selection of the button 254, the application function 146-3 may generate a request for a reservation at the restaurant indicated by the application card 50-3 for the entered number of guests (e.g., two) at the given time and date (Saturday, May 31 at 7:00 PM).

A server (e.g., server 100 in FIG. 1) may determine (e.g., predict) the application function 146-3 as a subsequent application function that a user of the client computer device 140 may use after using the application function 146-1. For example, the server may determine that a user may reserve a table at a restaurant that the user is reading a review about through the application view 46-1. The server may select default values for the drop-downs 248, 250 and 252. The server may select values for the drop-downs 248, 250 and 252 based on the contextual data received from the client computing device 140. For example, the contextual data may indicate historical values that the user selected for the drop-downs 248, 250 and 252. The user may change the values of the drop-downs 248, 250 and 252. For example, the user may increase the number of people from 2 to 4.

FIG. 2B illustrates another example application card 50-4 that represents an application function 146-4. In the example of FIG. 2B, the application function 146-4 refers to a messaging function. The application view 46-1 may display a restaurant review of a restaurant and the application card 50-4 enables the user to send a message to a contact about the restaurant. For example, the application view 46-1 may display a review of Thai Palace and the application card 50-4 enables the user to send a message about Thai Palace. By displaying the application card 50-4 in conjunction with the application view 46-1, the user does not have to manually navigate to an application view corresponding with the application function 146-4. For example, a user viewing a review of Thai Palace on YELP® does not have to press the home button to go to the home screen, launch another application (e.g., Messenger®), and navigate to the messaging function within the Messenger® application.

The application card 50-4 includes GUI elements that enable the user of the client computing device 140 to use (e.g., perform) the application function 146-4. The GUI elements may include a drop-down 260, a text field 262, and a button 264. The drop-down 260 may indicate a contact. The text field 262 may receive and display a message that can be sent to the contact. The button 264 may be a submit button. Upon receiving a selection of the button 264, the application function 146-4 may send the message to the contact.

A server (e.g., server 100 in FIG. 1) may determine (e.g., predict) the application function 146-4 as a subsequent application function that a user of the client computer device 140 may use after using the application function 146-1. For example, the server may determine that a user may message a contact about a restaurant when the user is reading a review of the restaurant in the application view 46-1. The server may select a value for the drop-down 260 to be a contact with whom the user of the client computing device 140 communicates most frequently. The server may select a value for the drop-down 260 to be the last contact with whom the user of the client computing device 140 communicated. The server may select a default message as a value for the text field 262. The server may select a value for the text field 262 based on the contextual data received from the client computing device 140. For example, the contextual data may indicate historical messages that the user may have sent to the contact indicated by the drop-down 260. The user may change the value of the drop-down 260 and the text field 262. For example, the user can send the message to Veronica instead of Betty.

Figure 3:
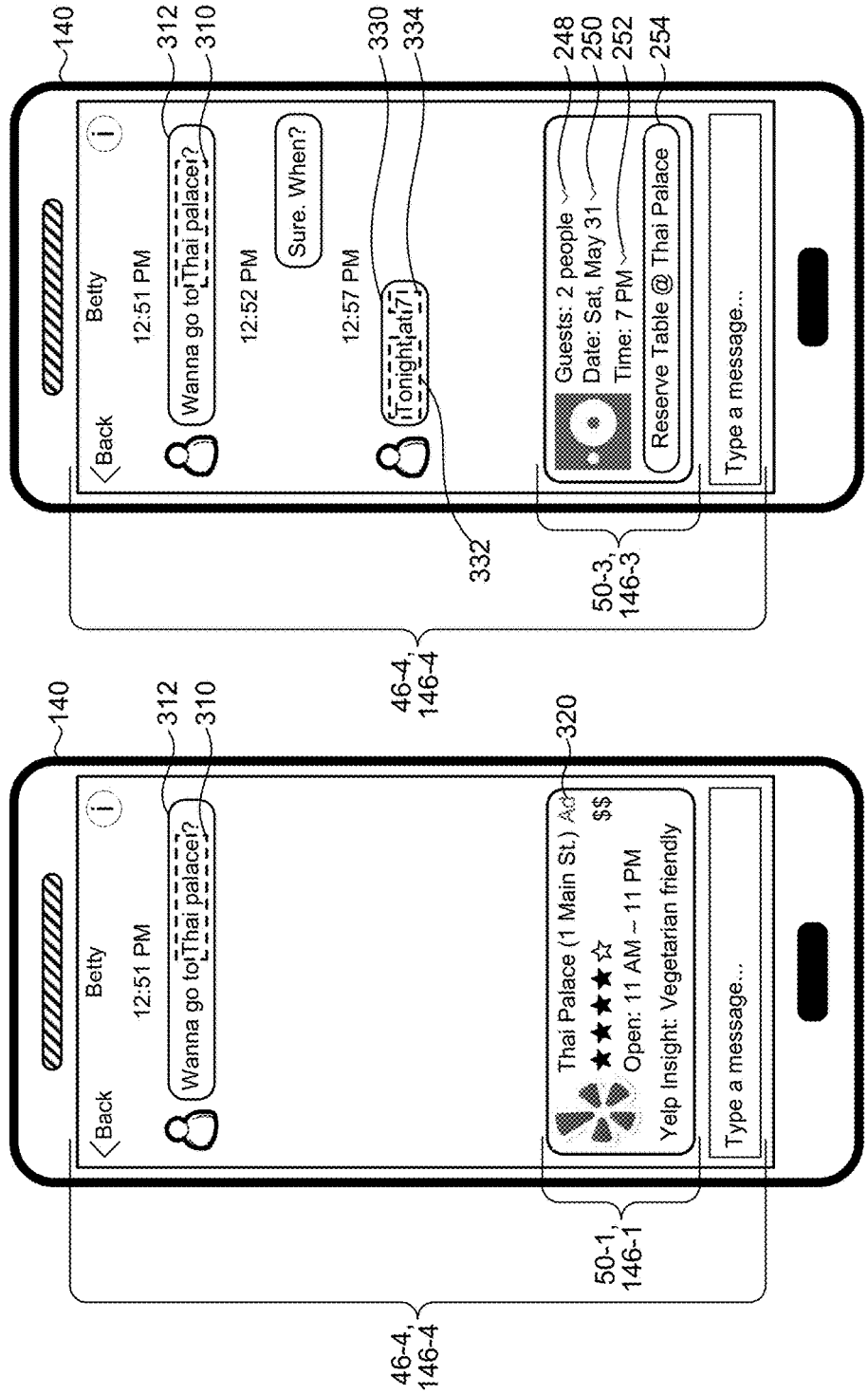

FIG. 3A illustrates an example application view 46-4 that represents an application function 146-4 of the active application. In the example of FIG. 3A, the active application is a messaging application, and the application function 146-4 is a messaging function of the messaging application. The application function 146-4 may enable a user of the client computing device 140 to send and receive messages. The client computing device 140 may display the application card 50-1 in conjunction with the application view 46-4. The client computing device 140 may display the application card 50-1 based on detecting an entity 310 in a message 312. The entity 310 may be associated with the application function 146-1. For example, the entity 310 may be a restaurant and the application function 146-1 may be a restaurant review function that can display a review of the restaurant.

A server (e.g., server 100 in FIG. 1) may receive the message 312 as contextual data. The server may identify the entity 310 in the message 312. The server may identify an application function that is associated with the entity 310. The server may identify the application function by identifying an application function that can display information about the entity 310. For example, the server may identify Thai palace as the entity 310 and the restaurant review function of YELP® as the application function 146-1.

The application card 50-1 may be an advertisement (e.g., sponsored application card). The application card 50-1 may include indicium 320, for example, to indicate that the application card 50-1 is an advertisement. A developer of the active application may receive a financial incentive when an application card 50 is displayed. The developer may receive the financial incentive in response to the client computing device 140 performing a defined action. For example, the developer of the application function 146-4 may receive the financial incentive when the user clicks on the application card 50-1 (e.g., pay-per-click) or when the application card 50-1 is overlaid upon the GUI of the application (e.g., pay-per-impression).

The server may determine that two application functions correspond with the entity 310. The server may determine a financial incentive associated with selecting each application function and select the application function with the higher financial incentive. For example, the server may determine that the restaurant review function of the YELP® application and a restaurant review function of the TRIPADVISOR® application (another crowd-sourced review application) correspond with the restaurant entity 310 "Thai Palace". The server may select the restaurant review function of the YELP® application instead of the restaurant review function of the TRIP ADVISOR® application, for example, because YELP® provides a financial incentive of $0.37 whereas TRIP ADVISOR® only provides $0.25.

In the example of FIG. 3A, the application function 146-4 may be referred to as a current application function. The application function 146-1 may be referred to as a predicted subsequent application function, for example, because the application function 146-1 may be a prediction of an application function that the user may use subsequent to using the application function 146-4. Advantageously, the user of the client computing device 140 may view a restaurant review of Thai Palace without having to manually launch the YELP® application and searching for Thai Palace within the YELP® application. Furthermore, the user may launch the YELP® application to a state that displays the restaurant review of Thai palace by pressing on the application card 50-1.

FIG. 3B illustrates an example implementation in which the client computing device 140 replaces the application card 50-1 with another application card 50-3 as the information displayed by the application view 46-4 changes. In the example of FIG. 3B, the client computing device 140 displays the application view 46-4 for the application function 146-4. The client computing device 140 may receive a message 330 through the application function 146-4. The message 330 may indicate a date 332 and a time 334. The client computing device 140 may transmit the date 332 and the time 334 as contextual data to a server (e.g., server 100 in FIG. 1).

The server receives the contextual data including the messages 312 and 330. The server may use the messages 312 and 330 to predict an application function that the user of the client computing device 140 may use subsequent to using the application function 146-4. The server may identify the entity 310 as a restaurant. The server may identify a date entity 332 and a time entity 334 in a subsequent message 330. The server may predict that the user intends to reserve a table at the restaurant at the date and time indicated in the message 330. The server may identify an application function (e.g., application function 146-3) that enables that user to reserve a table at the restaurant. In the example of FIG. 3B, the application function 146-3 is a "reserve table" function of the OPENTABLE® application. The server transmits the application card 50-3 representing the application function 146-3.

The application card 50-3 may receive function parameters. The function parameters may include a number of guests (e.g., drop-down 248), a date (e.g., drop-down 250), and a time (e.g., drop-down 252). The server may determine values for the function parameters based on the contextual data. For example, the server may determine the date and time function parameters by identifying the date entity 332 and the time entity 334 in the message 330. A developer of the application function 146-3 may provide a financial incentive to a developer of the application function 146-4 for displaying the application function 146-3. For example, the developer of the OPENTABLE® application may provide a financial incentive to the developer of the MESSENGER™ application (e.g., Facebook, Inc.) for displaying the reserve table function of the OPENTABLE® application based on the messages communicated via MESSENGER™. By displaying the application card 50-3, the user of the client computing device 140 does not have to manually launch the OPENTABLE® application, navigate to an application view for the reserve table function, and manually enter the function parameters.

Figure 4:
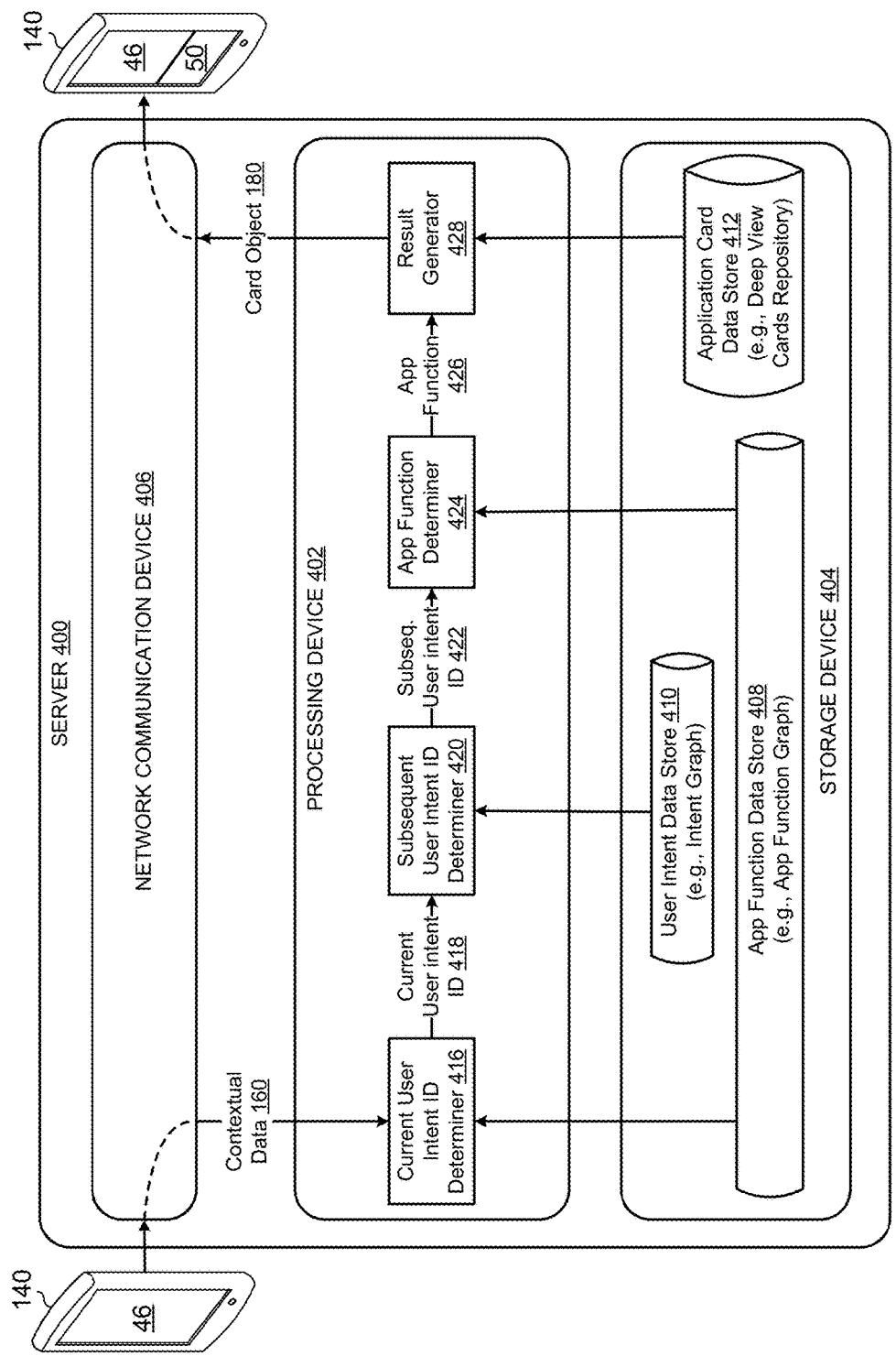
FIG. 4 is a block diagram of an example server that determines an application card that can be displayed on the client computing device based on the contextual data of the client computing device.

FIG. 4 illustrates a server 400. The server 400 illustrates an example implementation of the server 100. The server 400 receives contextual data (e.g., contextual data 160) from a client computing device (e.g., client computing device 140). The contextual data indicates a current application view that the client computing device may be currently displaying. The server 400 uses the contextual data to determine an application card (e.g. application card 50) that can be displayed on the client computing device in conjunction with the current application view. The server 400 transmits the application card to the client computing device. The server 400 may transmit the application card to the client computing device by transmitting a card object (e.g., card object 180).

The server 400 may include a processing device 402, a storage device 404, and a network communication device 406. The processing device 402 may include a collection of one or more computing processors that execute computer readable instructions. The computing processors of the processing device 402 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 402 may execute a current user intent ID determiner 416 (intent estimator 416, hereinafter), a subsequent user intent ID determiner 420 (intent predictor 420, hereinafter), an application function ID determiner 424 (function determiner 424, hereinafter), and a result generator 428. The processing device 402 may execute instructions, stored in the storage device 404 that cause the processing device 402 to implement the intent estimator 416, the intent predictor 420, the function determiner 424, and the results generator 428.

The storage device 404 stores data. The storage device 404 may include one or more computer readable storage mediums. For example, the storage device 404 may include solid state memory devices, hard disk memory devices, optical disk drives, a read-only memory, nanotube-based storage devices, or the like. The storage device 404 may be connected to the processing device 402 via a bus and/or a network. Different storage mediums within the storage device 404 may be located at the same physical location (e.g., in the same data center, same rack, or same housing). Different storage mediums of the storage device 404 may be distributed (e.g., in different data centers, different racks, or different housings). The storage device 404 may implement (e.g., store) a user intent data store 410 (e.g., intent graph), an application function data store 408 (e.g., function graph), and an application card data store 412.

The network communication device 406 may communicate with a network (e.g., network 190 shown in FIG. 1). The network communication device 406 may include one or more communication interfaces that perform wired communication (e.g., via Ethernet, Universal Serial Bus (USB), or fiber-optic cables). The network communication device 406 may perform wireless communication (e.g., via Wi-Fi, cellular network, or satellites). The network communication device 406 may include a transceiver that communicates with the network in accordance with an Institute of Electrical and Electronics Engineers (IEEE) specification (e.g., Ethernet, Wireless Local Area Network (LAN), or the like). The network communication device 406 may include a transceiver that communicates with the network in accordance with a 3rd Generation Partnership Project (3GPP) specification (e.g., Code Division Multiple Access (CDMA), Long Term Evolution (LTE), LTE-Advanced, or the like). The network communication device 406 may include a transceiver that communicates with the network in accordance with a Universal Serial Bus (USB) specification (e.g., via a USB port).

The server 400 may be implemented by a cloud computing platform. The cloud computing platform may include a collection of remote computing services. The cloud computing platform may include computing resources (e.g., processing device 402). The computing resources may include servers (e.g., physical servers or virtual machines). The cloud computing resources may include storage resources (e.g., storage device 404). The storage resources may include database servers that may support NoSQL, MySQL, Oracle, SQL Server, or the like. The cloud computing platform may include networking resources (e.g. network communication device 406). For example, the networking resources may distribute incoming requests for event notifications across multiple virtual private servers. Example cloud computing platforms include Amazon Web Services®, and Google Cloud Platform™.

Figure 5:
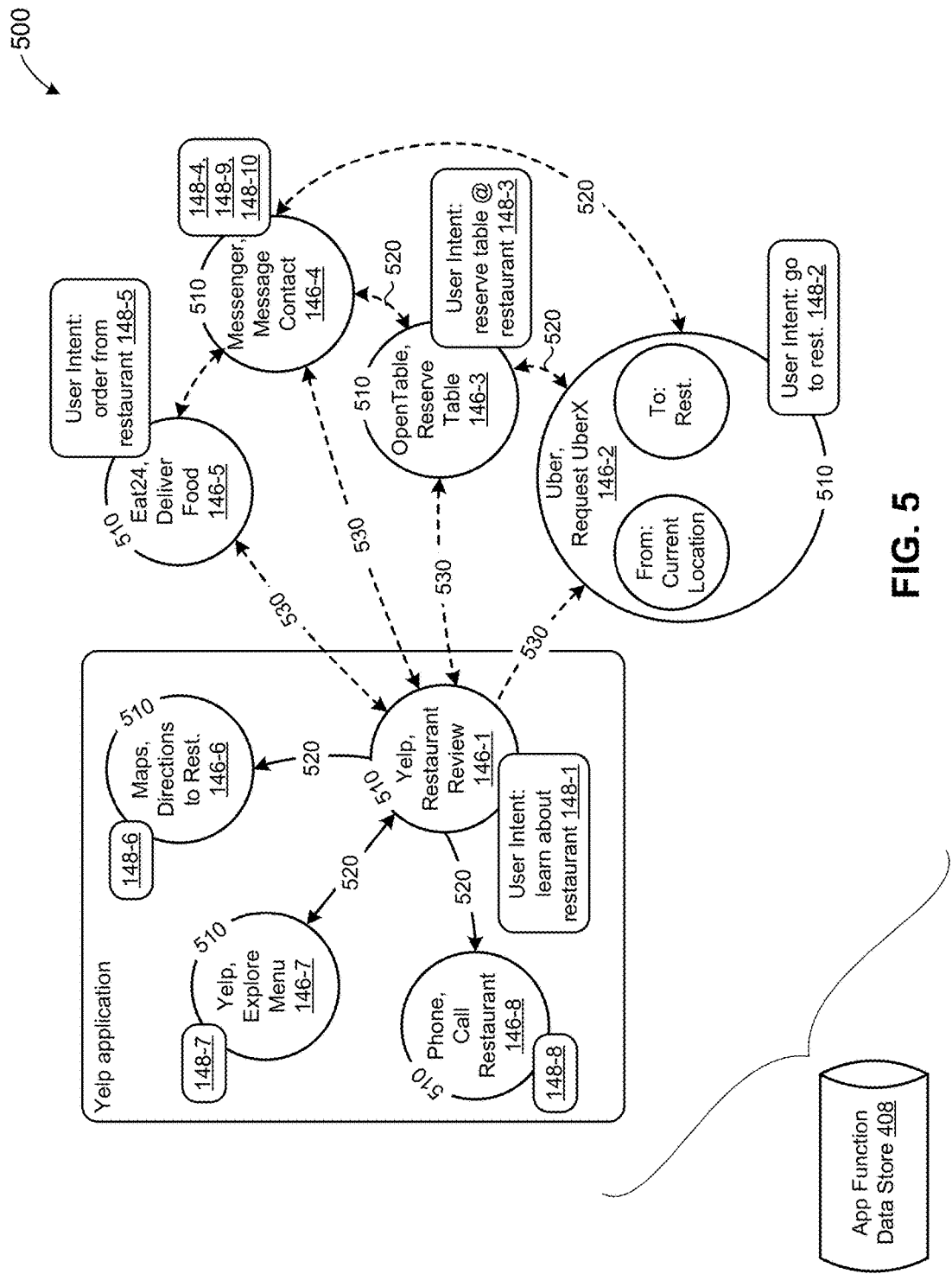
FIG. 5 is a diagram that illustrates an example application function graph stored in an application function data store.

The application function data store 408 may store application function identifiers (IDs). An application function ID may identify a corresponding application function. An application function ID may be associated with a user intent ID. The user intent ID associated with an application function ID may indicate an intent of a user that is currently using the corresponding application function. For example, a user intent ID for a restaurant review function may refer to the following user intent: 'learn about a restaurant'. Similarly, a user intent ID of a reserve table function may refer to 'reserve a table at the restaurant'. Furthermore, a user intent ID of a request-ride function may refer to 'travel to a destination address'. Moreover, a user intent ID of a deliver food function may refer to 'order food from a restaurant'. FIG. 5 illustrates an example implementation of the application function data store 408. The server 400 may determine the application function IDs and the user intent IDs associated with the application function IDs, for example, based on input from an operator (e.g., a human operator).

Figure 6:
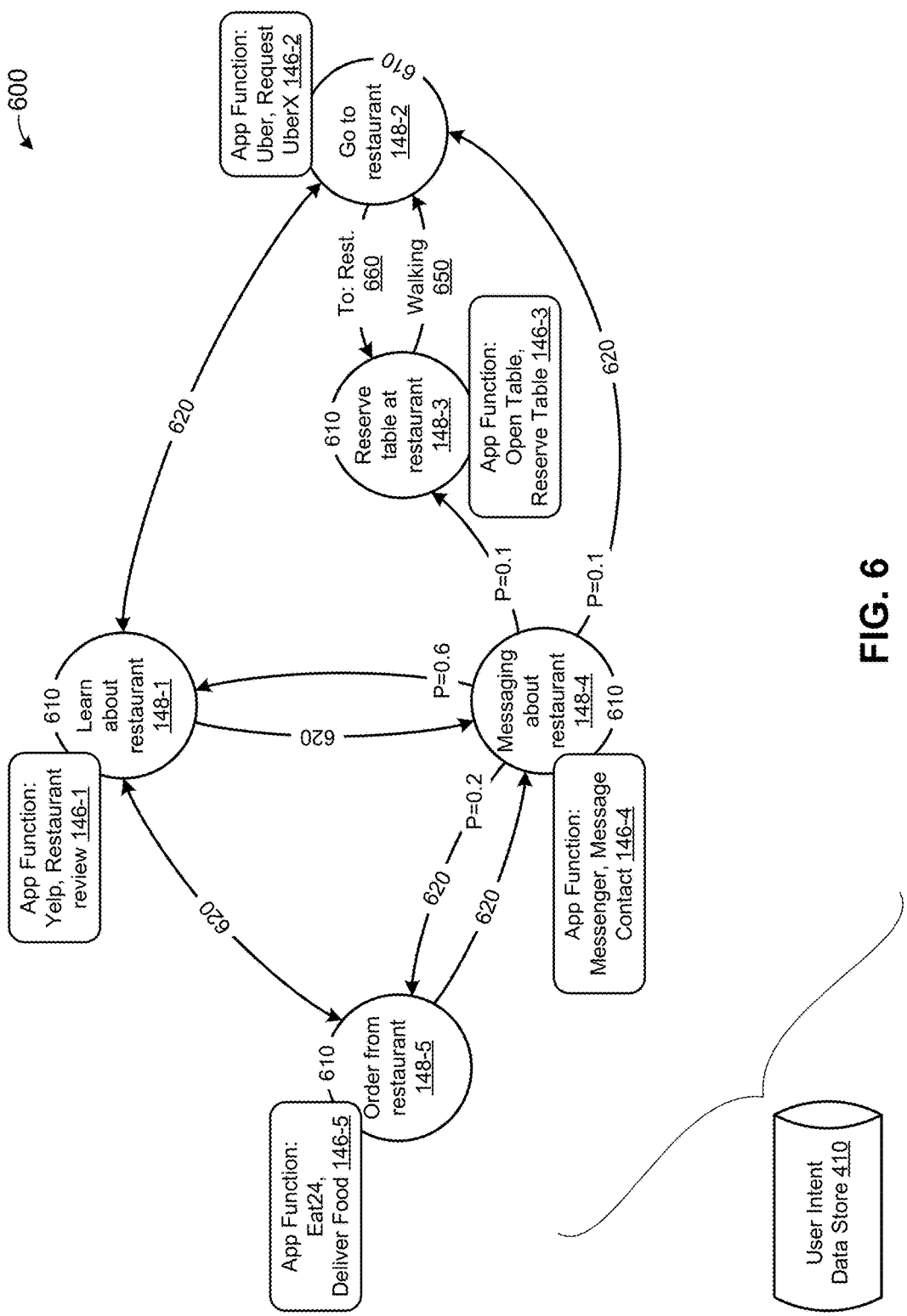
FIG. 6 is a diagram that illustrates an example user intent graph stored in a user intent data store.

The user intent data store 410 may store user intent IDs that refer to user intents. The user intent data store 410 may store relationships (e.g., temporal relationships) between the user intent IDs. For example, the user intent data store 410 may store transitions between the user intent IDs. The user intent data store 410 may indicate a prediction of a subsequent user intent ID given a current user intent ID. An example subsequent user intent may refer to 'go to a restaurant', for example, if a current user intent ID refers to 'learn about a restaurant'. Another example subsequent user intent ID may refer to 'reserve a table at a restaurant', for example, if a current user intent ID refers to 'learn about the restaurant'. FIG. 6 illustrates an example implementations of the user intent data store 410. The server 400 may determine the transitions between the user intent IDs, for example, based on input from an operator (e.g., a human operator).

The application card data store 412 may store card objects 180 that can be used to display application cards 50. The application card data store 412 may store the card objects 180 as card records. Each card object 180 may correspond with an application function. The card object 180 may include a template for the application card 50. The template may include GUI elements for the application card 50. Each GUI element may correspond with a function parameter of the application function. The card object 180 may include a uniform resource location (URL) that indicates the function parameters of the application function. An example card object 180 for the reserve-table function may indicate that the reserve-table function receives the following function parameters: a restaurant name, a number of guests, a reservation date, and a reservation time. Another example card object 180 for the restaurant-review function may indicate that the restaurant-review function has the following function parameters: a restaurant name and a location. Another example card object 180 for the request-ride function may indicate that the request-ride function receives the following function parameters: an origin address and a destination address.

The card object 180 may include computer-readable instructions for the client computing device 140 on rendering the application card 50 at the client computing device 140. The card object 180 may include computer-readable instructions that can be executed by the client computing device 140 to perform the corresponding application function. The computer-readable instructions in the card object 180 may refer to APIs, libraries and/or endpoints of the corresponding application function. When the computer-readable instructions in the card object 180 are executed by the client computing device 140, the client computing device 140 can make API calls to perform the corresponding application function.

The server 400 may receive the card objects 180 from an operator (e.g., a human operator). The server 400 may generate the card objects 180 by identifying function parameters of application functions. For example, the server 400 may analyze an application to determine the application functions within the application. The server 400 determine the function parameters of an application function by analyzing application views representing the application functions. For example, the server 400 may identify the function parameters by identifying text boxes and dropdowns in the application views. The server 400 identify the function parameters by crawling and/or scraping websites associated with applications. For example, the server 400 may identify function parameters on a website associated with an application and determine that the application includes the same function parameters.

The intent estimator 416 determines (e.g., estimates) a current user intent ID 418 based on the contextual data 160. The contextual data 160 may indicate a current application view 46 that the client computing device 140 may be displaying. The intent estimator 416 may identify the current application function ID, for example, by identifying the function ID 166 (shown in FIG. 1). The intent estimator 416 may query the application function data store 408 to determine a user intent ID associated with the application function ID 166. The intent estimator 416 may access the application function data store 408 and retrieve a user intent ID associated with the application function ID 166. The user intent ID associated with the application function ID 166 may be referred to as the current user intent ID 418. The current user intent ID may indicate a current intent of the user of the client computing device 140.

The application function ID 166, in some examples, is associated with multiple user intent IDs. Each user intent ID may include a confidence value that indicates a likelihood of the application function ID 166 matching the user intent ID. The intent estimator 416 may select the user intent ID with the highest confidence value. For example, the application function ID 166 may be associated with three different user intent IDs. One of the three user intent IDs may have a confidence value of 0.6 and the other two user intent IDs may have a confidence value of 0.2. The intent estimator 416 may select the user intent ID that has the confidence value of 0.6. The confidence values may be pre-determined (e.g., pre-calculated). For example, an operator (e.g., human operator) may input the confidence values in the application function data store 408.

The intent predictor 420 determines (e.g., predicts) a subsequent user intent ID 422 based on the current user intent ID 418. The intent predictor 420 may query the user intent data store 410 to determine a likely subsequent user intent ID 422 for the current user intent ID 418. The user intent data store 410 may store user intent IDs. For some user intent IDs, the user intent data store 410 may store a likely subsequent user intent ID 422. The intent predictor 420 may determine the subsequent user intent ID 422 by accessing the user intent data store 410 and retrieving the subsequent user intent ID associated with the current user intent 418. The intent predictor 420 may determine that the subsequent user intent ID 422 refers to 'going to the restaurant', for example, if the current user intent ID 418 refers to 'learning about the restaurant' and an accelerometer measurement indicates that the user is walking towards the restaurant. The intent predictor 420 may determine that the subsequent user intent ID 422 refers to 'reserve table at the restaurant', for example, if the current user intent ID 418 refers to 'planning to go to the restaurant' (e.g., as illustrated in FIG. 3B).

The function determiner 424 determines (e.g., identifies) an application function 426 that corresponds with the predicted subsequent user intent ID 422. The function determiner 424 may identify the application function 426 by searching the application function data store 408 based on the predicted subsequent user intent ID 422. The function determiner 424 may access the application function data store 408 and retrieve an application function ID that corresponds with the predicted subsequent user intent ID 422. The function determiner 424 may identify an application function that most closely matches (e.g., fulfills) the predicted subsequent user intent ID 422. The function determiner 424 may receive a list of application function IDs from the application function data store 408. Each application function ID may include a relevance value that indicates a relevance of the corresponding application function ID to the predicted subsequent user intent ID 422. The function determiner 424 may select the application function ID with the highest relevance value. An operator (e.g., human operator) may input the relevance values into the application function data store 408.

The result generator 428 determines (e.g., selects) the card object 180 for the predicted application function 426. The result generator 428 may access the application card data store 412 and retrieve the card object 180 corresponding with the predicted application function 426. The card object 180 may include function parameters for the predicted application function 426. The result generator 428 may determine (e.g., populate) the function parameters based on the contextual data 160. For example, the result generator 428 may determine a destination address parameter for a request ride application function based on an address displayed in the application view 46.

The application card data store 412 may store multiple corresponding card objects 180 for the application function 426. Some of the card objects 180 may be suitable for the client computing device 140, if an application including the application function 426 is installed on the client computing device 140. Other card objects 180 may be suitable for the client computing device 140, if the client computing device 140 does not have an application that includes the application function 426. The contextual data 160 may indicate the applications installed on the client computing device 140. The results generator 428 may select the appropriate card object 180 upon determining whether the application function 426 is installed on the client computing device 140.

Card objects 180 that are selected when the client computing device 140 does not include the application function 426 may include sufficient computer-readable instructions that can be executed by the client computing device 140 to perform the application function 426. Card objects 180 that are selected when the client computing device 140 includes the application function 426 may include fewer computer-readable instructions that: invoke the application function 426 on the client computing device 140, and cause the client computing device 140 to execute the application function 426 in the background when the application card 50 is displayed.

FIG. 5 illustrates an example application function graph 500. The application function graph 500 may be stored in the application function data store 408. The application function graph 500 may include graph nodes 510 that store information about application functions 146-1, 146-2 . . . 146-8. For example, the graph nodes 510 may store application function IDs for the application functions 146-1, 146-2 . . . 146-8. The graph nodes 510 may be connected via edges 520 and 530. The application functions 146-1, 146-2 . . . 146-8 may be associated with user intents 148-1, 148-2 . . . 148-10. The graph nodes 510 may stores user intent IDs that refer to the user intents 148-1, 148-2 . . . 148-10. In the example of FIG.

5, the application function 146-1 may refer to a restaurant review function in a crowd-sourced review application (e.g., YELP®) and the user intent 148-1 may refer to 'learning about the restaurant'. The application function 146-2 may refer to a request ride function (e.g., request UberX® function) in a ride-sharing application (e.g., UBER®) and the user intent 148-2 may refer to 'going to restaurant'. The application function 146-3 may refer to a reserve table function in a table reservation application (e.g., OPENTABLE®) and the user intent 148-3 may refer to 'reserving a table at the restaurant'.

An application function ID may be associated with multiple user intent IDs. For example, the application function 146-4 (e.g., messaging contact function) may be associated with user intents 148-4, 148-9 and 148-10. The user intent 148-4 may refer to 'chatting with a contact'. The user intent 148-9 may refer to 'planning to eat from a restaurant', for example, when a message includes the restaurant name (e.g., entity 310 in FIG. 3B). The user intent 148-10 may refer to 'planning to go to the restaurant', for example, when messages include the restaurant name, a data and a time (e.g., date 332 and time 334 in FIG. 3B). The application function 146-5 may refer to a deliver food function of a food delivery application (e.g., Eat24) and the user intent 148-5 may refer to 'order food from the restaurant'.

The edges 520 and 530 may indicate transitions between the application function IDs. A transition from the application function 146-1 to the application function 146-2 may refer to the application function 146-2 being used immediately after (e.g., within a threshold time period) the application function 146-1. The edges 520 may indicate transitions that a developer may have specified (e.g., programmed in program code for an application function). An edge 520 from the application function 146-1 to the application functions 146-6, 146-7 and 146-8 indicates that the application function 146-1 includes developer-programmed user-selectable links to the application functions 146-6, 146-7 and 147-8. For example, a restaurant review function (e.g., application function 146-1) may include a user-selectable link for getting directions to the restaurant (e.g., application function 146-6). Furthermore, the restaurant review function may include a user-selectable link for exploring a menu of the restaurant (e.g., application function 146-7). Moreover, the restaurant review function may include a user-selectable link for calling the restaurant (e.g., application function 146-8).

The edges 530 may indicate transitions that a server (e.g., server 400 in FIG. 4) determines. The edges 530 may indicate transitions that are not explicitly specified (e.g., programmed) by a developer. For example, the application function 146-1 may not include a developer-programmed user-selectable link for the application function 146-2. The server may determine that a user of a client computing device may use the application function 146-2 subsequent to using the application function 146-1. For example, the server may determine that a user viewing a restaurant review on the YELP® application can go to the restaurant using the UBER® application. Hence, the server may identify a transition between the restaurant review function (e.g., application function 146-1) and the request UberX® function (e.g., application function 146-2) of the UBER® application.

As illustrated in FIG. 5, the server can connect application functions from different applications even though the developer of the application functions may not have explicitly connected the application functions via user-selectable links. For example, the server can connect the application function 146-1 to the application function 146-2 even though a developer of the application function 146-1 may not have programmed a user-selectable link for the application function 146-2. In the example of FIG. 5, the server may connect the 'request UberX' function to the 'restaurant review function' of the YELP® application even though the YELP® application does not include a user-selectable link for requesting an UberX®.

An application function may include different application states. Different application states of an application function may have different function parameters. For example, the application function 146-2 may have an origin address parameter (e.g., 'From' address) and a destination address parameter (e.g., 'To' address). Different values of the origin address parameter and the destination address parameter may yield different application states of the application function 146-2. The application function graph 500 may be stored as an application state graph. In an application state graph, the graph nodes 510 may represent application states, and the edges 520 and 530 may represent transitions between the application states. The application function graph 500 may be stored using any suitable data structure (e.g., a look-up table (LUT), an array, a multi-dimensional array, or the like).

FIG. 6 illustrates an example user intent graph 600. The user intent graph 600 includes graph nodes 610 that store user intent IDs that refer to user intents 148-1, 148-2 . . . 148-5. The user intent graph 600 includes edges 620 that connect the graph nodes 610. Each user intent ID may be associated with an application function ID. The application function ID associated with a user intent ID may help achieve the referenced user intent when the corresponding application function is executed at a client computing device. For example, the restaurant review function (e.g., application function 146-1) helps a user learn about a restaurant (e.g., user intent 148-1). Similarly, the request UberX® function (e.g., application function 146-2) helps a user go to the restaurant (e.g., user intent 148-2).

The edges 620 may be directed edges. A direction of an edge 620 may indicate a prediction of a subsequent user intent ID. For example, an edge 620 directed from the user intent 148-4 to the user intent 148-1 may indicate that when a current user intent ID matches (e.g., equals) a user intent ID of the user intent 148-4 then a subsequent user intent ID may be a user intent ID of the user intent 148-1. Similarly, when a current user intent ID refers to 'messaging about a restaurant' (e.g., user intent 148-4), then a subsequent user intent ID may refer to 'learning about the restaurant' (e.g., user intent 148-1). In response to the server determining the user intent 148-1 as the subsequent user intent, the client computing device may display an application card for an application function associated with the user intent 148-1. For example, the client computing device may display an application card 50-1 for the application function 146-1 in conjunction with an application view 46-4 for the application function 146-4 (e.g., as illustrated in FIG. 3A).

A current user intent ID may lead (e.g., refer) to several potential subsequent user intent IDs. For example, the user intent 148-4 may lead to one of the user intents 148-1, 148-2, 148-3 and 148-5. The edges 620 may be weighted edges that indicate the probability of a current user intent leading to a subsequent user intent. Table 1 illustrates the probabilities of the user intent 148-4 transitioning into the user intents 148-1, 148-2, 148-3 and 148-5.

TABLE 1

Probabilities of Subsequent User Intents

| Current User intent | Subsequent user intent | Probability |
|---|---|---|
| 148-4 | 148-1 | 0.6 |
|  | 148-2 | 0.1 |
|  | 148-3 | 0.1 |
|  | 148-5 | 0.2 |

The server may determine the probabilities based on application usage data from other client computing devices. For example, the server may monitor user-initiated transitions between different application functions in order to determine the probabilities. The probability of the user intent 148-1 may be 0.6, for example, because 60% of users may have manually navigated to an application view of the application function 146-1 immediately after (e.g., within a threshold time, for example, 5 seconds) viewing an application view of the application function 148-4. Referring to FIG. 1, the server 100 may determine the probabilities based on the application usage history 170 of the client computing device 140. For example, the probability of the user intent 148-5 may be 0.2 because the user of the client computing device 140 may have used the application function 146-5 immediately after (e.g., within a threshold time, for example, 5 seconds) using the application function 146-4 on 20% of occasions.

Some edges 620 may specify a sensor measurement trigger 650. For example, the edge from the user intent 148-3 to the user intent 148-2 may specify an accelerometer measurement that corresponds with the user of the client computing device walking. In the example of FIG. 6, a user of the client computing device may be reserving a table at the restaurant via a reserve table function (e.g., application function 146-3). The user may also be walking towards the restaurant (e.g., as indicated by the accelerometer measurement and GPS location). The client computing device may display an application card for the request UberX function, so that the user can get a ride to the restaurant. The application card for the request UberX function may be similar to the application card 50-2 for the application function 146-2 illustrated in FIG. 1.

Some edges may specify a function parameter value 660. For example, the edge from the user intent 148-2 to the user intent 148-3 may specify a condition that a destination address field of the Request UberX® function include an address of a restaurant. Since the user is going to the restaurant, the server may determine that the user may likely want to reserve a table at the restaurant. Hence, the server may identify the user intent 148-3 as the subsequent user intent.

Figure 7:
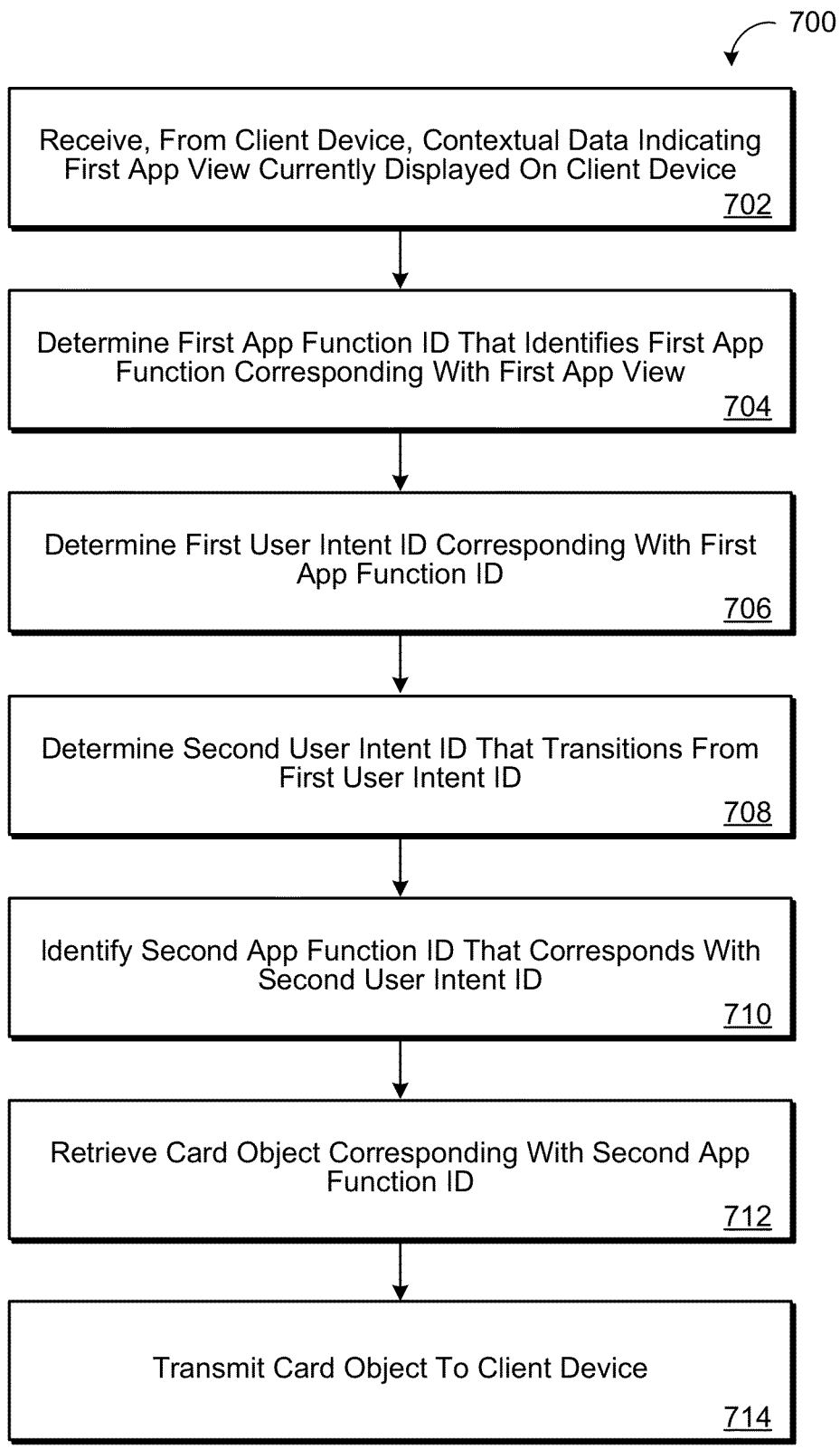
FIG. 7 is a block diagram that illustrates an example method for determining an application card that can be displayed on the client computing device based on the contextual data of the client computing device.

FIG. 7 illustrates a method 700 for determining (e.g., selecting) an application card for an application function that can be displayed at a client computing device in conjunction with an application view for another application function. At 702, a server receives contextual data from a client computing device. The contextual data may indicate a current application view displayed at the client computing device. The contextual data may indicate sensor measurements. The contextual data may include an application usage history.

At 704, the server determines a current application function ID that identifies a current application function corresponding with the current application view based on the contextual data. The server may determine the current application function ID by comparing the contextual data with application function IDs stored in a data store (e.g., the application function data store 408 illustrated in FIGS. 4 and 5).

At 706, the server determines (e.g., estimates) a current user intent ID associated with the current application function ID. The server may access an application function data store (e.g., the application function data store 408 illustrated in FIGS. 4 and 5) and retrieve the current user intent ID from the application function data store. The current user intent ID may refer to a current intent of a user of the client computing device.

At 708, the server determines (e.g., predicts) a subsequent user intent ID that transitions from the current user intent ID. The server may access a user intent data store (e.g., the user intent data store illustrated in FIGS. 4 and 6) and retrieve the subsequent user intent ID from the user intent data store. If multiple user intent IDs transition from the current user intent ID, the server may select the user intent ID with the highest confidence value as the subsequent user intent ID. Referring to FIG. 6, if the current user intent ID refers to the user intent 148-4, the server may select the user intent ID for the user intent 148-1 as the subsequent user intent ID. The server may determine the subsequent user intent ID based on sensor measurements. For example, referring to FIG. 6, if the current user intent ID refers to the user intent 148-3 and an accelerometer measurement indicates that the user of the client computing device is walking, the server may select the user intent ID of the user intent 148-2 as the subsequent user intent ID. The server may determine the subsequent user intent ID based on function parameter values in the current application view. For example, referring to FIG. 6, if the current user intent ID refers to the user intent 148-2 and a destination address parameter includes a restaurant address, the server may select the user intent ID of the user intent 148-3 as the subsequent user intent ID.

At 710, the server identifies an application function ID that corresponds with the subsequent user intent ID. The server may use the application function data store 408 and/or the user intent data store 410 to identify the application function ID that corresponds with the subsequent user intent ID. For example, the server may perform an application function search in the application function data store 408 for an application function ID that is suitable for the subsequent user intent ID. Additionally or alternatively, the server may use the user intent graph 600 to identify the application function ID that corresponds with the subsequent user intent ID. For example, the server may select an application function ID associated with the subsequent user intent ID from the user intent graph 600. The application function ID corresponding with the subsequent user intent ID may be referred to as a predicted application function ID.

At 712, the server retrieves a card object corresponding with the predicted application function ID. For example, referring to FIG. 4, the server may retrieve the card object 180 from the application card data store 412. At 714, the server transmits the card object to the client computing device.

Figure 8:
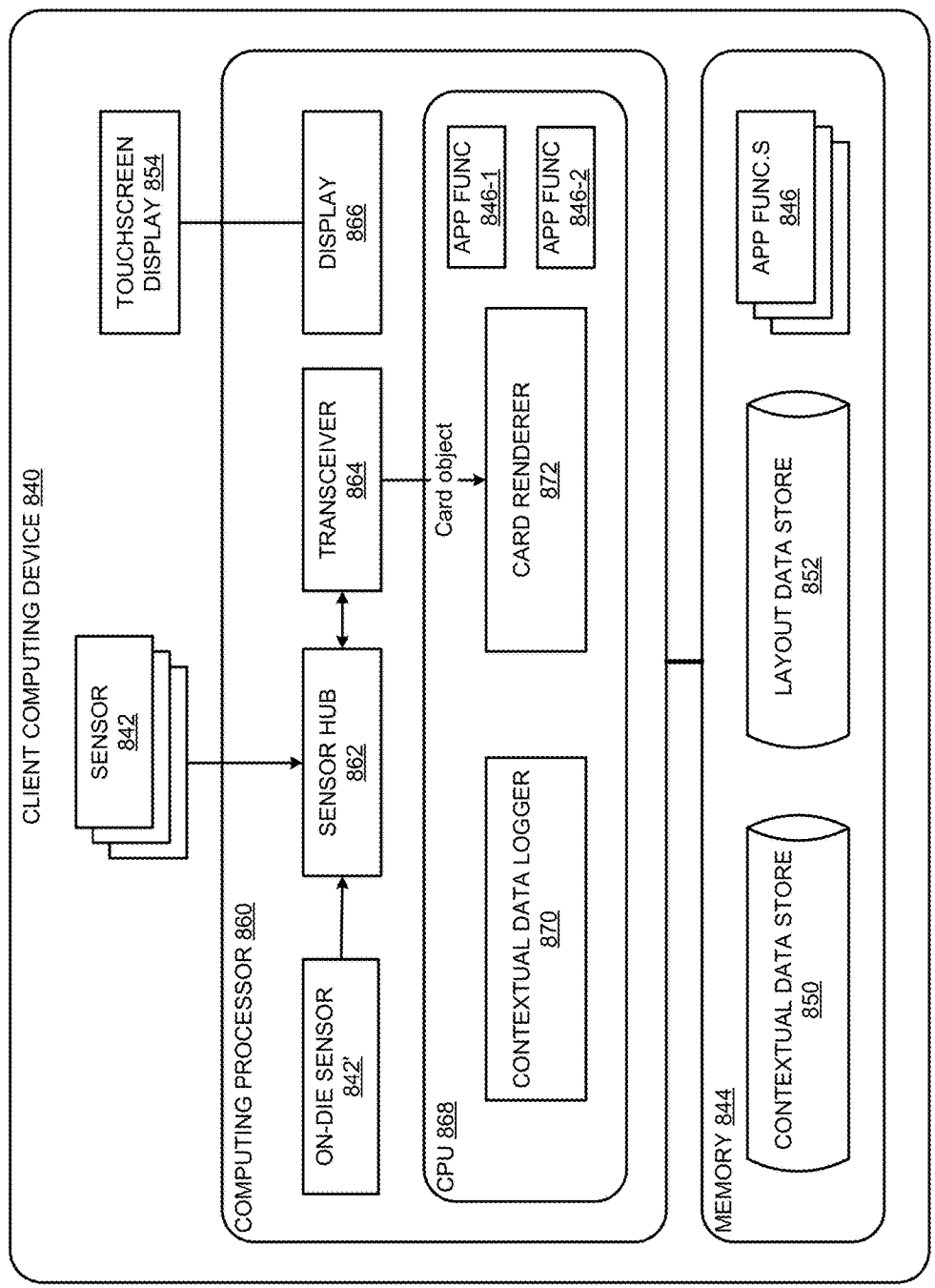
FIG. 8 is a block diagram that illustrates an example implementation of the client computing device shown in FIG. 1.

FIG. 8 illustrates an example client computing device 840. The client computing device 840 illustrates an example implementation of the client computing device 140 shown in FIG. 1. The client computing device 840 may include sensors 842, a memory 844 (e.g., memory hardware), a touchscreen display 854, and a computing processor 860 (e.g., data processing hardware).

The memory 844 may store application functions 846. The application functions 846 may be similar to the application functions 146 shown in FIG. 1. The memory 844 may store a contextual data store 850 and a layout data store 852. The contextual data store 850 may store contextual data (e.g., contextual data 160 shown in FIG. 1). The layout data store 852 may store layouts that can be used to display application cards (e.g., application cards 50 shown in FIG. 1). The layouts may be stored as layout files. The layouts may be referred to as application card templates that include GUI elements that correspond with function parameters for an application function 846.

The computing processor 860 may include an on-die sensor 842', a sensor hub 862, a transceiver 864, display circuitry 866, and a central processing unit (CPU) 868. References to the sensors 842 may include the on-die sensor 842'. The sensors 842 may include a location sensor, for example, Global Positioning System (GPS) and/or Global Navigation Satellite System (GLONASS). The sensors 842 may include an accelerometer, a magnetometer, gyroscope, or the like.

The sensor hub 862 may manage the sensors 842. The sensor hub 862 may receive sensor measurements from the sensors 842. The sensor hub 862 may determine when to turn on, or turn off the sensors 842. The sensor hub 862 may turn on a sensor 842 and command the sensor 842 to record a sensor measurement. The sensor hub 862 may turn off the sensor 842, for example, to conserve power. The sensor hub 862 may receive sensor data periodically (e.g., once every hour, once every minute, or the like). The sensor hub 862 may capture sensor data in response to receiving a request (e.g., from a server via the transceiver 864).

The transceiver 864 enables electronic communication with a network (e.g., network 190 shown in FIG. 1). The transceiver 864 may include a cellular transceiver, for example, a LTE transceiver, a LTE-Advanced transceiver, or a 5G (5th generation mobile network) transceiver. The transceiver 864 may include a Wi-Fi transceiver. The transceiver 864 may include a ZigBee transceiver, a Bluetooth transceiver (e.g., Bluetooth Low Energy transceiver), a NFC transceiver, or the like. The transceiver 864 may communicate with the network via wired communications. For example, the transceiver 864 may communicate with the network via an Ethernet cable, a fiber-optic cable, a USB cable, or the like.

The display circuitry 866 may cause the touchscreen display 854 to display information. The display circuitry 866 may receive user input (e.g., user selections) from the touchscreen display 854. The display circuitry 866 may include a display driver. The display driver may drive the touchscreen display 854. For example, the display circuitry 866 may include a Light Emitting Diode (LED) driver that drives a LED display. The display circuitry 866 may drive a stereoscopic display (e.g., an autostereoscopic 3D display).

The CPU 868 may include an ARM processor based on a reduced instruction set computing (RISC) architecture. The CPU 868 may include multiple cores (e.g., dual-core, quad-core, or octa-core). The CPU 868 may execute computer-readable instructions stored in the memory 844. When the CPU 868 executes computer-readable instructions, the CPU 868 may implement a contextual data logger 870 and an application card renderer 872. The CPU 868 may execute the application functions 846-1 and 846-2. The application functions may be similar to the application functions 146-1 and 146-2 shown in FIG. 1.

The contextual data logger 870 may include an application that operates on the application layer. Additionally or alternatively, the contextual data logger 870 may include an operating system process that operates on the presentation layer. The contextual data logger 870 may log contextual data (e.g., contextual data 160 shown in FIG. 1). The contextual data logger 870 may store the contextual data in the contextual data store 850. The contextual data logger 870 may receive sensor measurements from the sensor hub 862 and store the sensor measurements in the contextual data store 850. The contextual data logger 870 may log information being displayed on the touchscreen display 854. For example, the contextual data logger 870 may log information that indicates a current application function ID (e.g., an on-screen application function ID, for example, the application function ID 166 shown in FIG. 1).

The contextual data logger 870 may log function parameters from the current application function. For example, the contextual data logger 870 may log a restaurant name from a restaurant name parameter of a restaurant review function. Similarly, the contextual data logger 870 may log a destination address from a destination address field of a request ride function. The contextual data logger 870 may log an application usage history by logging application functions (e.g., all application functions) used at the client computing device 840.

The contextual data logger 870 may transmit (e.g., send) the contextual data to a server via the transceiver 864. The contextual data logger 870 may transmit the contextual data periodically, for example, once every minute, once every day, or once every month. The contextual data logger 870 may transmit the contextual data upon receiving a request from an application, a user of the client computing device 840 and/or a server.

The application card renderer 872 receives a card object (e.g., the card object 180 shown in FIG. 1) via the transceiver 864. The card object indicates a subsequent application function that a user of the client computing device 840 may want to use based on the contextual data. The application card renderer 872 renders (e.g., displays) an application card (e.g., application card 50 shown in FIG. 1) on the touchscreen display 854 based on information included in the card object. The card object may indicate a layout for the application card. For example, the card object may indicate the GUI elements to display on the application card. The application card renderer 872 uses the layout indicated by the card object to display the application card.

The card object may include function parameter values. The application card renderer 872 may populate the GUI elements of the application card, so that the GUI elements display the function parameter values included in the card object. Additionally or alternatively, the application card renderer 872 may determine the function parameters values for the GUI elements in the application card based on the contextual data logged by the contextual data logger 870. For example, the application card renderer 872 may use a restaurant name specified in a message of a messaging application to populate a restaurant name parameter of a restaurant review function. Similarly, the application card renderer 872 may use a restaurant address specified in a restaurant review function to populate a destination address of a ride requesting function. The application card renderer 872 may retrieve the contextual data from the contextual data store 850 and/or the application card 872 may receive the contextual data from the contextual data logger 870.

The card object may include a layout identifier that identifies an application card layout stored in the layout data store 852. The application card renderer 872 may retrieve the application card layout from layout data store 852. The application card renderer 872 may use the retrieved application card layout to display the application card.

The application card renderer 872 may display the application card so that the application card hovers over a current application view. The application card renderer 872 may control a transparency level of the application card so that the application card does not conceal the current application view. The application card renderer 872 may reduce a size of the current application view to a threshold percentage of the display area on the touchscreen display 854. For example, the application card renderer 872 may reduce the size of the current application view to 75% of the display area. The application card rendered 872 may use the remainder of the display area to display the application card. For example, the application card renderer 872 may use the remaining 25% of the display area to display the application card.

The application card renderer 872 may execute computer-readable instructions included in the card object to display the application card. The application card renderer 872 may execute computer-readable instructions included in the card object to perform an application function corresponding with the application card. The application card renderer 872 may execute the application function corresponding with the application card as a background operation. For example, referring to FIG. 1, the client computing device 140 may execute the application function 146-2 in the background while the application card 50-2 is displayed.

Figure 9:
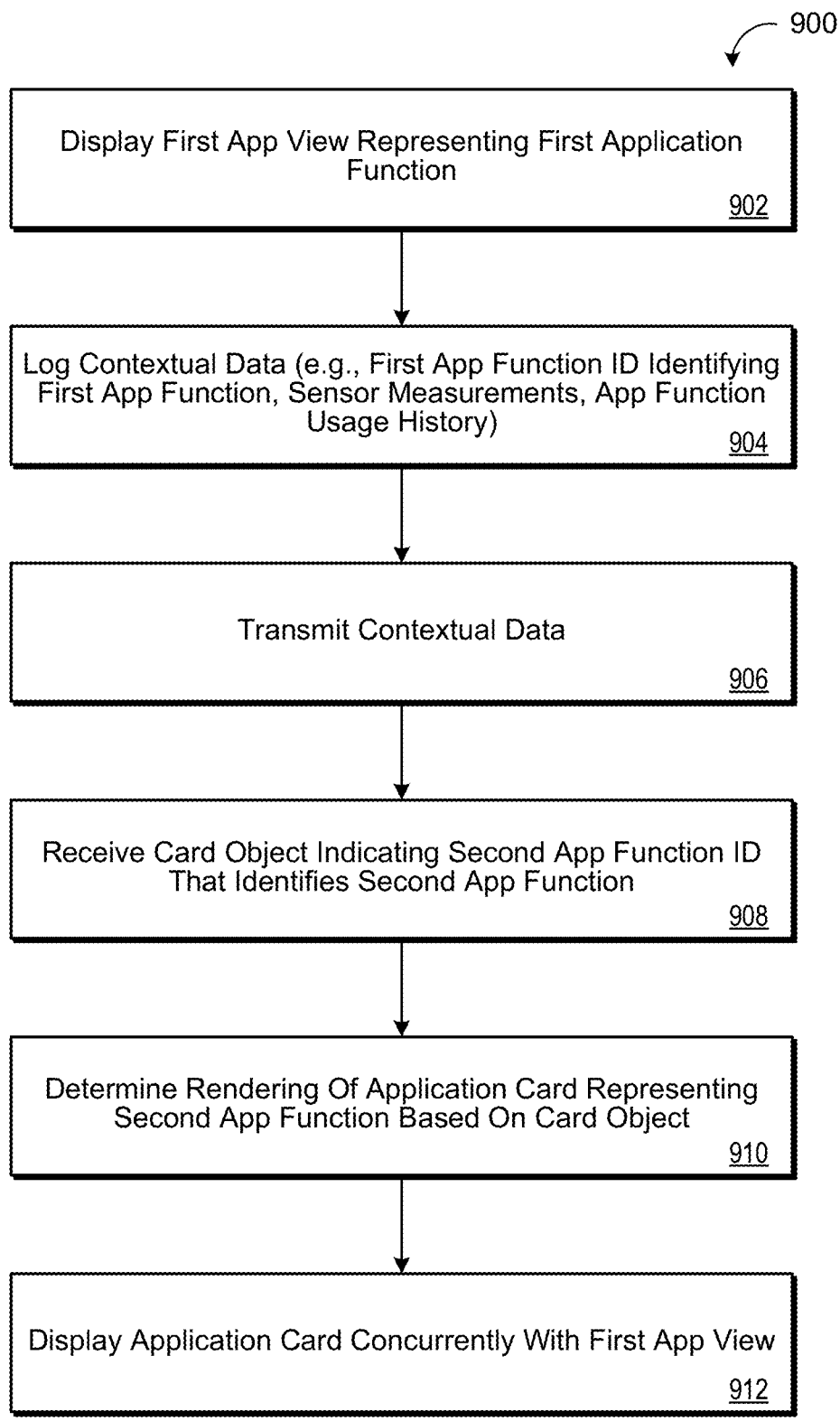
FIG. 9 is a block diagram that illustrates an example method for concurrently displaying an application card of an application function with an application view of another application function at the client computing device.

FIG. 9 illustrates a method 900 for displaying an application card representative of a subsequent application function ID. At 902, a client computing device displays a current application view of a current application function on a display of the client computing device. For example, referring to FIG. 1, the client computing device 140 may display the application view 46-1 representing the application function 146-1.

At 904, the client computing device logs contextual data (e.g., contextual data 160 shown in FIG. 1). The client computing device may store the contextual data in a data store (e.g., contextual data store 850). The contextual data may include information indicating the current application function ID, sensor measurements, and/or application usage history.

At 906, the client computing device transmits the contextual data to a server. The client computing device may retrieve the contextual data from the contextual data store and transmit the retrieved data to the server. The client computing device may be storing the contextual data at a higher frequency than transmitting the contextual data to the server, for example, to conserve battery power. For example, referring to FIG. 1, the client computing device 140 may transmit the contextual data 160 to the server 100.

At 908, the client computing device receives a card object that corresponds with an application function ID for a subsequent application function. For example, referring to FIG. 1, the client computing device 140 may receive the card object 180 from the server 100. The card object may include executable instructions that the client computing device can execute to display the application card and perform the corresponding application function.

At 910, the client computing device determines a rendering for the application card. For example, the client computing device may execute computer-readable instructions included in the application card to display the application card. Alternatively, the client computing device may retrieve an application card layout indicated by the card object and use the application card layout to display the application card in conjunction with the current application view.

At 912, the client computing device displays the application card of the predicted application function concurrently with the application view of the current application function. The application card may include GUI elements, so that the predicted application function can be used without switching applications and manually navigating to the application view of the predicted application function. Referring to FIG. 1, the application card 50-2 is an example of the application card and the application function 146-2 is an example of the predicted application function.

Figure 10:
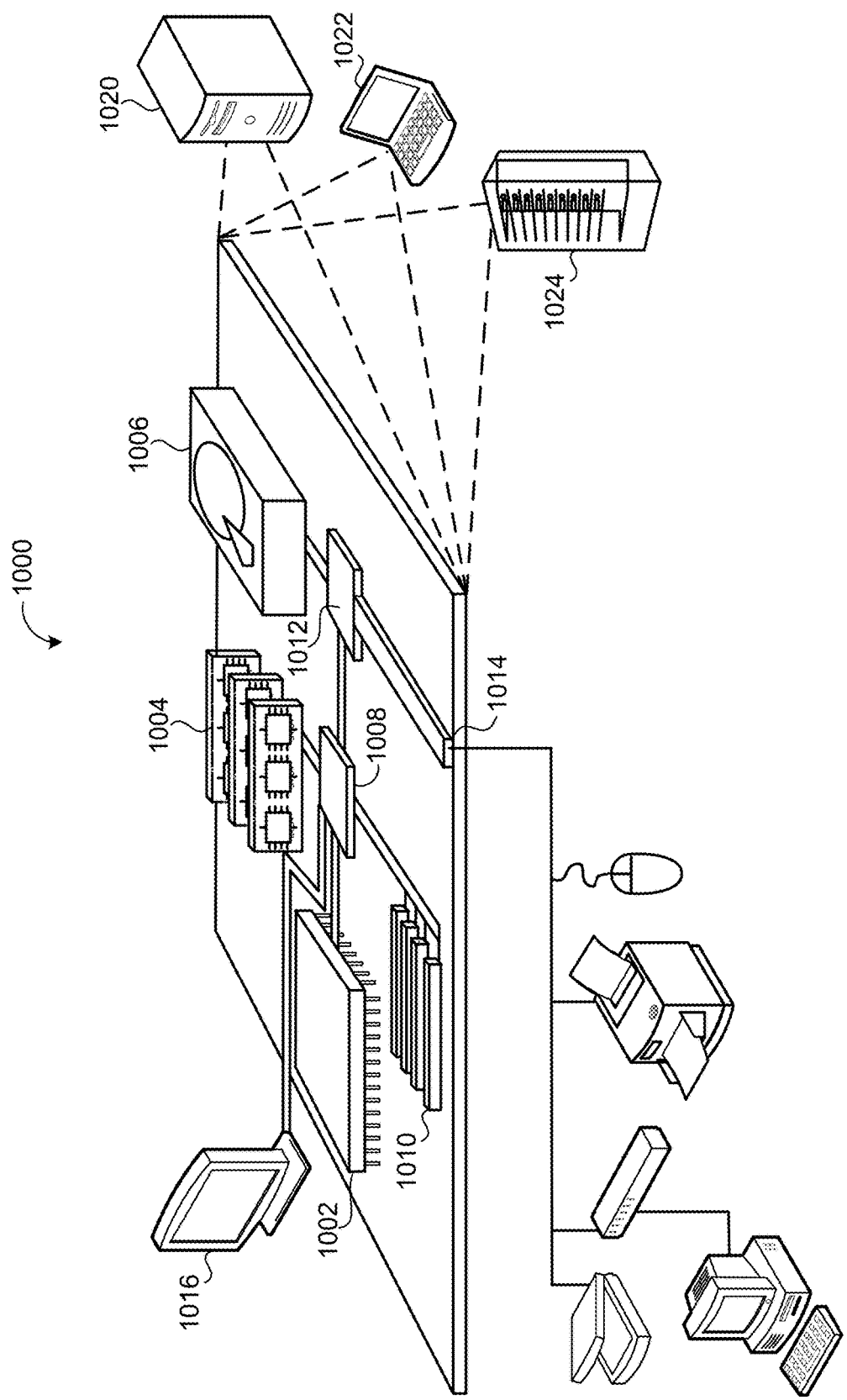
FIG. 10 is a block diagram that illustrates an example computing device that may be used to implement the server and/or the client computing device shown in FIG. 1.

FIG. 10 is a block diagram of an example computing devices 1000 that may be used to implement the systems and methods described in this document. For example the computing device 1000 may be used to implement the server 100 and/or the client computing device 140 shown in FIG. 1. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a graphical user interface (GUI) on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In some implementations, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In some implementations, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer, such as a laptop computer 1022. Alternatively, components from computing device 1000 may be combined with other components in a mobile device (not shown). Each of such devices may contain one or more of computing device 1000, and an entire system may be made up of multiple computing devices 1000 communicating with each other.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A server comprising:
    a network communication device;
    a storage device that stores:
        an application function data store that stores application function identifiers (IDs) that identify application functions, and user intent IDs that identify user intents corresponding with the application function IDs;
        a user intent data store that stores the user intent IDs and transitions between the user intent IDs; and
        a card data store that stores card objects corresponding with the application function IDs, each card object comprising computer-readable instructions that are executable at client computing devices to perform the application function identified by the application function ID; and
    a processing device that executes computer-readable instructions that, when executed by the processing device, cause the processing device to:
        receive contextual data from a client computing device via the network communication device, the contextual data indicating a first application view currently being displayed on the client computing device;
        identify a first application function ID that identifies a first application function corresponding with the first application view by comparing the contextual data with the application function IDs stored in the application function data store;
        determine a first user intent ID that corresponds with the first application function ID, the first user intent ID indicating a current user intent of a user of the client computing device;
        determine a second user intent ID that transitions from the first user intent ID, the second user intent ID indicating a prediction of a subsequent user intent of the user based on the current user intent;
        identify a second application function ID that corresponds with the second user intent ID, the second application function ID identifying a second application function;
        retrieve a card object corresponding with the second application ID from the card data store; and
        transmit the card object to the client computing device via the network communication device.

2. The server of claim 1, wherein the computer-readable instructions cause the processing device to determine the first user intent ID by retrieving the first user intent ID from the application function data store.

3. The server of claim 1, wherein the computer-readable instructions cause the processing device to determine the second user intent ID by retrieving the second user intent ID from the user intent data store.

4. The server of claim 1, wherein the computer-readable instructions cause the processing device to identify the second application function ID by searching the application function data store for an application function that corresponds with the second user intent ID.

5. The server of claim 1, wherein the card object comprises graphical user interface (GUI) elements for the second application function.

6. The server of claim 5, wherein the computer-readable instructions further cause the processing device to:
  determine function parameter values for the second application function based on the contextual data; and
  populate the GUI elements with the determined function parameter values.

7. The server of claim 5, wherein the computer-readable instructions further cause the processing device to:
  determine function parameter values for the second application function by using an application programming interface (API), a library and/or an endpoint of a service associated with the second application function; and
  populate the GUI elements with the determined function parameter values.

8. The server of claim 1, wherein:
  the application function data store comprises an application function graph that stores the application function IDs as nodes of the application function graph; and
  the user intent data store comprises a user intent graph that stores the user intent IDs as nodes of the user intent graph and the transitions between the user intent IDs as edges that connect the nodes of the user intent graph.

9. The server of claim 1, wherein the computer-readable instructions further cause the processing device to:
  receive application function usage data from other client computing devices; and
  update the transitions between the user intent IDs stored in the user intent data store based on the application function usage data.

10. The server of claim 1, wherein a first application comprises the first application function and a second application comprises the second application function.

11. A mobile computing device comprising:
  a touchscreen display;
  a plurality of sensors;
  a transceiver;
  a memory; and
  a computing processor that executes computer-readable instructions that, when executed by the computing processor, cause the computing processor to:
    display a first application view representing a first application function on the touchscreen display;
    store contextual data in the memory, the contextual data comprising:
      a first application function identifier (ID) that identifies the first application function;
      sensor measurements measured by the plurality of sensors; and
      application function usage data comprising a history of application views displayed on the touchscreen display;
    transmit the contextual data to a server via the transceiver;
    receive a card object from the server in response to transmitting the contextual data to the server, the card object indicating a second application function ID that identifies a second application function;
    determine a rendering of an application card representing the second application function based on the card object; and
    display the application card concurrently with the first application view.

12. The mobile computing device of claim 11, wherein the computer-readable instructions cause the computing processor to display the first application view by executing a first application that comprises the first application function.

13. The mobile computing device of claim 11, wherein the computer-readable instructions cause the computing processor to determine the rendering of the application card by executing a second application that comprises the second application function.

14. The mobile computing device of claim 11, wherein the computer-readable instructions cause the computing processor to display the application card by displaying graphical user interface (GUI) elements for the second application function.

15. The mobile computing device of claim 14, wherein the computer-readable instructions further cause the computing processor to:
  receive function parameter values for the second application function via the GUI elements; and
  invoke an application programming interface (API), a library and/or an endpoint of a service associated with the second application function based on the received function parameter values.

16. The mobile computing device of claim 11, wherein:
  the card object comprises executable instructions that, upon execution, perform the second application function; and
  the computer-readable instructions cause the computing processor to determine the rendering of the application card by executing the executable instructions in the card object.

17. The mobile computing device of claim 11, wherein the computer-readable instructions further cause the computing processor to:
  receive updates to the card object; and
  update the application card based on the updates.

18. The mobile computing device of claim 11, wherein the computer-readable instructions further cause the computing processor to:
  receive a second card object from the server in response to changes in the first application view, the second card object indicating a third application function ID that identifies a third application function;
  determine a rendering of a second application card representing the third application function based on the second card object; and
  replace the application card with the second application card, the second application card being displayed concurrently with the first application view.

19. The mobile computing device of claim 11, wherein the computer-readable instructions further cause the computing processor to display an indicium to indicate that the application card comprises an advertisement.

20. A computer-implemented method comprising:
  storing, in a storage device of a server, an application function graph that stores application function identifiers (IDs) as graph nodes and user intent IDs that identify user intents corresponding with the application function IDs, the application function IDs identifying application functions;

storing, in the storage device, a user intent graph that stores the user intent IDs as graph nodes and transitions between the user intent IDs as edges;

storing, in the storage device, a card data store that stores card objects corresponding with the application function IDs, each card object comprising computer-readable instructions that are executable at client computing devices to perform the application function identified by the application function ID;

receiving, via a network communication device of the server, contextual data from a client computing device, the contextual data indicating a first application view currently being displayed on the client computing device;

identifying, by a processing device of the server, a first application function ID that identifies a first application function corresponding with the first application view by comparing the contextual data with the application function IDs stored in an application function data store;

determining, by the processing device, a first user intent ID that corresponds with the first application function ID, the first user intent ID indicating a current user intent of a user of the client computing device;

determining, by the processing device, a second user intent ID that transitions from the first user intent ID, the second user intent ID indicating a prediction of a subsequent user intent of the user based on the current user intent;

identifying, by the processing device, a second application function ID that corresponds with the second user intent ID, the second application function ID identifying a second application function;

retrieving, by the processing device, a card object corresponding with the second application ID from the card data store; and transmitting, via the network communication device, the card object to the client computing device.

21. The computer-implemented method of claim 20, further comprising:

crawling, by the processing device, applications, websites associated with the applications, and/or an application marketplace to identify the application function IDs;

selecting, by the processing device, user-selectable graphical user interface (GUI) elements displayed on application views representing the application function IDs to identify connections between the application function IDs;

storing, by the processing device, the identified connections between the application function IDs as graph edges in the application function graph; and identifying, by the processing device, the transitions between the user intent IDs based on input from an operator and/or historical application views from other client computing devices.

* * * * *